Dec. 24, 1940. J. E. CONKLIN Re. 21,670
SUPPORTING BRACKET FOR SHOWER OR SPRAY DEVICES
Original Filed Jan. 27, 1936
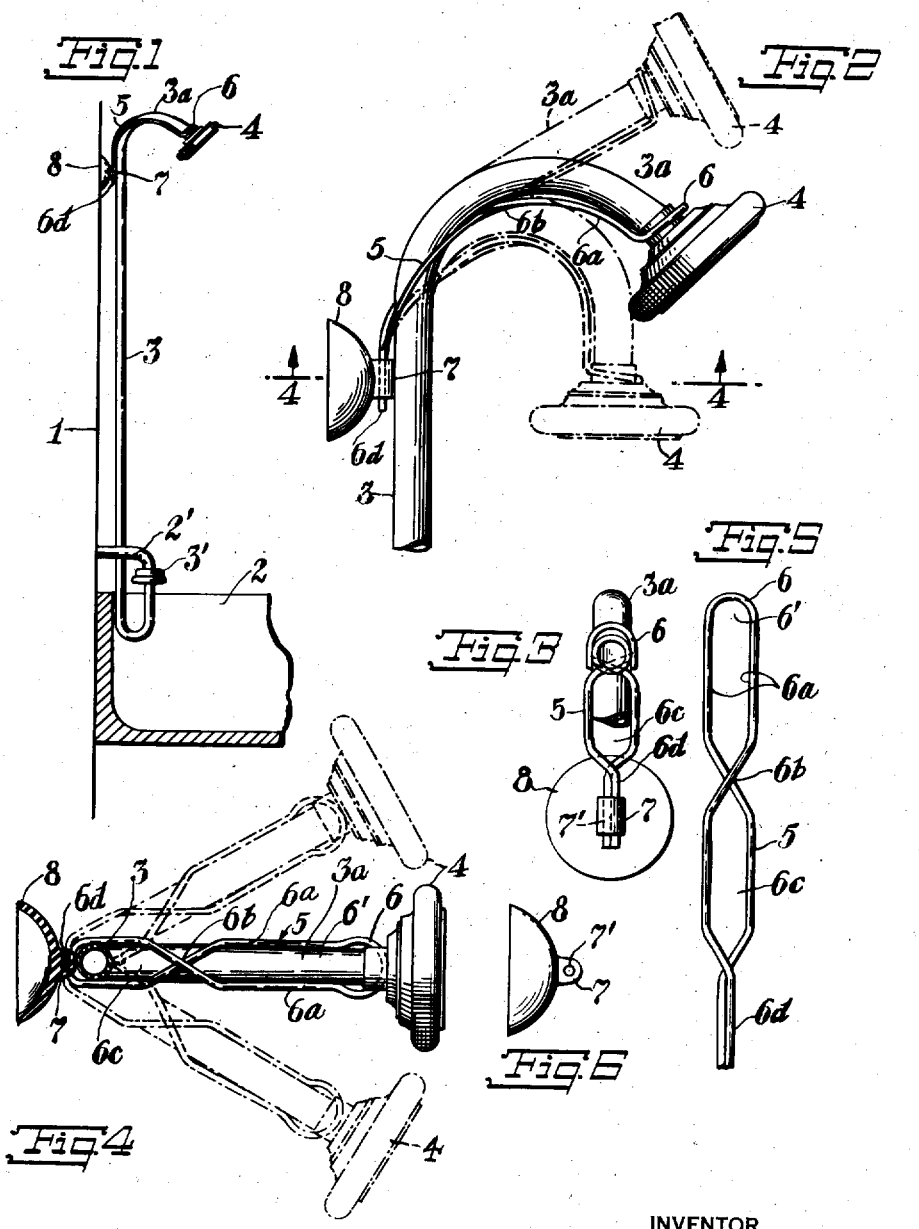
INVENTOR
John Edward Conklin
BY
Joseph J. O'Brien
ATTORNEY Reissued Dec. 24, 1940 Re. 21,670

UNITED STATES PATENT OFFICE 21,670

SUPPORTING BRACKET FOR SHOWER OR SPRAY DEVICES

John Edward Conklin, Brooklyn, N. Y.; Frank H. Michaelis executor of said John Edward Conklin, deceased Original No. 2,095,170, dated October 5, 1937, Serial No. 60,931, January 27, 1936. Renewed May 28, 1937. Application for reissue October 5, 1939, Serial No. 298,061

4 Claims. (Cl. 248—75)

This invention relates to improvements in supporting brackets for shower or spray devices.

One of the objects of my invention is to produce, at low cost and preferably from wire, a goose-neck bracket-arm capable of adjustably bending and holding, in adjusted position, the rubber-hose neck portion adjacent to the spray head of a shower or spray device to cause the spray head to assume a suitable position and the water passing therethrough to traverse a predetermined path.

Another object of this invention is to provide a supporting bracket arm of the type specified formed of a settable metal of low elastic limit to permit adjustment and automatic setting of the metal of the bracket-arm and a consequent automatic setting of the spray head in predetermined position.

Still another object of my invention is to utilize, in a device of the type specified, a bracket-base comprising a rubber suction cup having a pivotal connection with said bracket-arm adapted to permit adjustment and setting laterally of said bracket-arm in relation to the base.

Still another object of my invention is, in a device of the character specified, to provide a bracket-arm having a non-circular pivot element in combination with a circular pivot socket formed in the rubber attaching base of a rubber suction cup.

With these and other objects in view, the invention comprises the combination of members and arrangement of parts so combined as to coact and co-operate with each other in the performance of the functions and accomplishment of the results herein contemplated, and comprises in one of its adaptations the species or preferred form illustrated in the accompanying drawing, in which:

Fig. 1 is a view in side elevation of a shower device embodying my invention mounted over a bath tub and connected to a bath tub faucet;

Fig. 2 is an enlarged view in side elevation showing varying positions of the top portion of the device shown in Fig. 1;

Fig. 3 is a front elevation of the top part of the device shown in Fig. 1, with the spray head removed;

Fig. 4 is a section on the line 4—4 of Fig. 2, looking upwardly in the direction of the arrows;

Fig. 5 is a view in plan of a wire bracket-arm before being bent into its goose-neck hose-holding form; and Fig. 6 is a top plan view of a suction cup having a bracket base member provided with a circular pivot socket adapted to co-operate with the non-circular pivot of my bracket-arm.

Referring now to the drawing which illustrates a preferred embodiment of my invention, 1 indicates the wall of a bath room, 2 a bath tub having a faucet 2′ and 3 is a conventional rubber-hose bath-shower device connected at one end by hose connection 3′ with the faucet 2′, and having, at its opposite upper end, a spray head 4.

In accordance with this invention, the neck-portion of the rubber hose adjacent to the spray head is adapted to be adjustably bent and securely held in any suitable vertically-adjusted position by means of an adjustable bracket-arm 5, so that the spray head may be caused to spray the water passing therethrough in a given path into a tub or like receptacle.

In the preferred form of my invention illustrated, the bracket-arm 5 is formed of wire, preferably composed of a settable metal of low elastic limit, which will be readily deformable to permit adjustment and automatic setting in any suitable vertically-adjusted position of the said bracket-arm 5 and consequently when fastened to the upper neck portion of the elastic rubber hose 3 will cause a similar setting of said neck portion and a locating of the spray head 4 in any vertically-adjusted position that may be desirable for spraying water from said spray head when functioning as a shower device.

As illustrated, the bracket-arm is formed of a single strand of wire doubled on itself, bendable into substantial goose-neck conformation and having, at its upper portion, a loop 6 bent at its upper end to form a yoke 6′ preferably adapted to engage the upper or rear surface of the neck section or portion $3^a$ of the hose 3 adjacent to the spray head so as to function as a holder or ferrule for the head 4, while the parallel strands $6^a$ of said loop extend beneath said neck section and merge with a crossing or X-shaped part $6^b$ also extending beneath said portion and contacting with the lower or front surface of the hose. This X-shaped portion in turn merges with a lower looped portion $6^c$ the strands of a part of which extend on opposite sides of the hose across the body thereof to a position at the rear surface of the hose where it merges with a pivot portion $6^d$ non-circular in cross-section formed by crossing the strands below said lower loop into parallel contiguity with each other. The wire bracket-arm thus engages or contacts at varying longitudinal positions with the neck section of the hose at diametrically opposite parts of the periphery thereof, so that upon a bending and automatic setting of the bracket-arm, the elastic hose will be held in a similar position.

While a bracket-arm of settable metal might be employed to provide for both vertical and lateral or horizontal adjustment, I prefer to procure automatic lateral or horizontal adjustment of the bracket-arm and of the spray head by utilizing an automatically-settable pivot-bearing comprising a pivot member composed of the ends of the parallel contiguous strands of wire $6^d$ and an elastic pivot-socket 7′ in a rubber base block 7 of a rubber suction cup 8. It will be apparent that when a pivot member is fitted tightly into an elastic socket, the pivot may be swung around its axis and will be automatically held in any position to which it is moved. In order to procure more efficient gripping action between the socket and the pivot member, I utilize a circuit socket in connection with a non-circular pivot member composed of the ends of the two contiguous strands $6^d$ of the wire bracket.

In using my invention, the bracket-arm is preferably initially bent and set into the arc or curve required to spray the water to a position within a given arc from its mounting, then the bracket and its suction-cup mounting element is positioned on the wall, after which the sprayed stream may be moved to any position within the arc initially fixed by moving or swinging the bracket pivot member pivotally in the socket. If further adjustment of the arc is necessary this may be accomplished by a bending on the wall or the suction cup may be removed and replaced on the wall for this purpose.

Having described my invention, I claim:

1. A supporting bracket for rubber-hose shower or spray devices including a metallic spray-head having a connection with said hose at its outer end, embodying, in combination, a supporting base-member having a socket for reception of a pivot member, a bracket-arm composed of wire and having a lower end portion forming a pivot member engageable with said socket and connected to said supporting base-member and an extension portion having an inner looped section disposed adjacent to the lower end of said bracket-arm and adapted to cross said hose section in one direction from a rear peripheral portion to a peripheral portion at the front and beneath said hose and another outer section extending outwardly and having an outer end portion adapted to cross said hose in the direction opposite to the said inner loop and to engage said hose section above its connection with said spray head.

2. A supporting bracket for rubber-hose shower or spray devices including a metallic spray-head having a connection with said hose at its outer end embodying, in combination, a supporting base-member having a socket for reception of a pivot member, a bracket-arm composed of wire and having a lower end portion forming a pivot member engageable with said socket and connected to said supporting base-member and an extension portion having an inner looped section disposed adjacent to the lower end of said bracket-arm and adapted to cross said hose section in one direction from a rear peripheral portion to a peripheral portion at the front and beneath said hose and another outer section extending outwardly and having an outer end portion adapted to cross said hose in the direction opposite to said inner loop and to engage said hose section above its connection with said spray-head, said bracket-arm being composed of a settable metal of low elastic limit to enable automatic vertical adjustment of said spray-head and said supporting base-member being formed of rubber to provide a pivot socket expansible to permit insertion of said pivot member and contractible thereon to automatically hold said bracket in varying horizontally-adjustable positions.

3. A support for rubber-hose shower or spray devices including a metallic spray-head having a connection with said hose at its outer end, embodying, in combination, a supporting base-member having a socket, a metallic bracket-arm having a lower portion embracing a part of the periphery of said hose and also extending into said socket in the supporting base-member to provide, adjacent to the supporting base-member, a fastening connection between said hose, bracket-arm and said supporting base-member, said bracket-arm also having an intermediate hose-supporting portion of goose-neck conformation and an outer-end part of U-shaped conformation adapted to embrace and engage the hose adjacent to the spray-head.

4. A support for rubber-hose shower or spray devices including a metallic spray-head having a connection with said hose at its outer end, embodying, in combination, a bracket-supporting base member having bracket-fastening means, a hose-supporting metallic bracket provided with a pair of oppositely positioned hose-engaging portions between and above which the periphery of said hose extends, said bracket having a connection portion extending into engagement with said bracket fastening means of the supporting member, said hose-engaging and connecting portions providing, adjacent to the supporting member, a secure fastening connection between the said hose and its supporting bracket and between said bracket and said supporting member, said bracket-arm also having, above said connection an intermediate outwardly-projecting hose extension portion and also being provided with an outer end part of U-shaped conformation adapted to embrace and engage the hose adjacent to the spray head.

JOHN EDWARD CONKLIN.